Dec. 29, 1931. A. O. MASON 1,838,231
METHOD OF RECLAIMING AUTOMOBILE RADIATORS
Original Filed Feb. 10, 1927 2 Sheets-Sheet 1
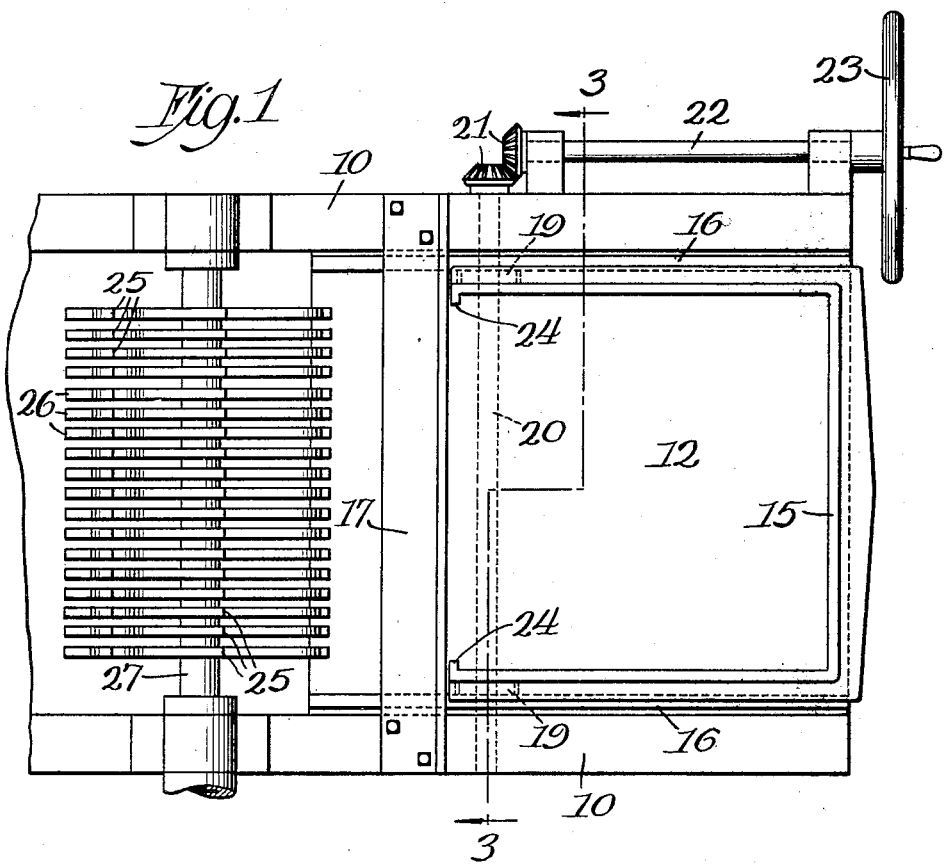
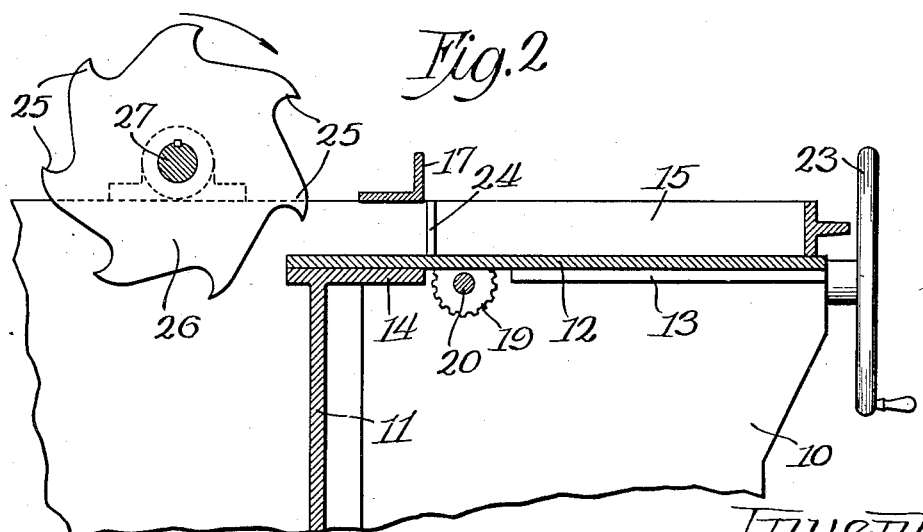
Inventor
Archibald O. Mason
By Fisher, Clapp, Soans & Pond Attys.

Dec. 29, 1931.  A. O. MASON  1,838,231
METHOD OF RECLAIMING AUTOMOBILE RADIATORS
Original Filed Feb. 10, 1927  2 Sheets-Sheet 2
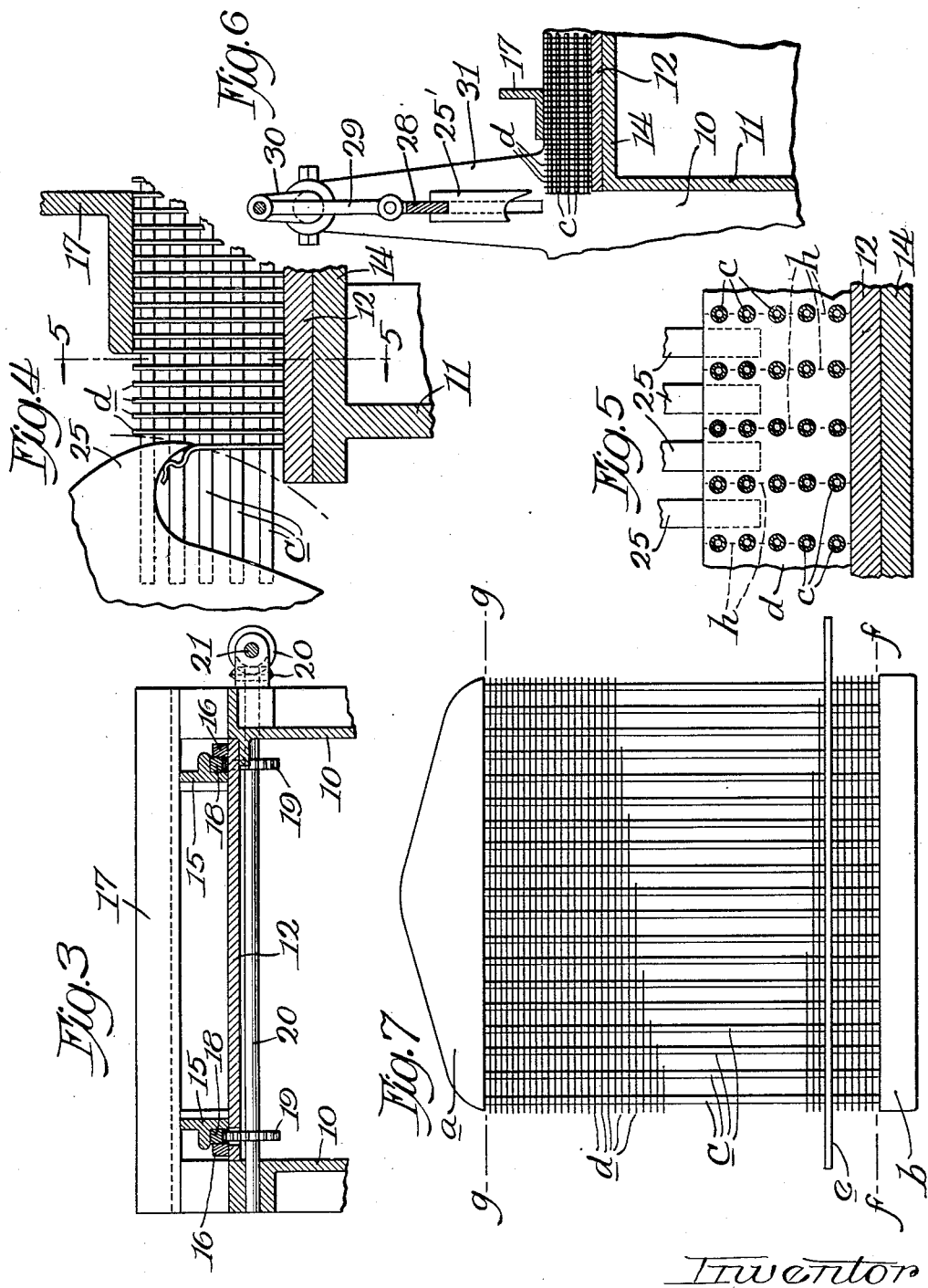
Inventor
Archibald O. Mason
By Fisher, Clapp, Soans & Pond  Attys.

Patented Dec. 29, 1931                                                1,838,231

UNITED STATES PATENT OFFICE

ARCHIBALD O. MASON, OF HIGHLAND PARK, ILLINOIS

METHOD OF RECLAIMING AUTOMOBILE RADIATORS

Original application filed February 10, 1927, Serial No. 167,337, Patent No. 1,725,990, dated August 27, 1929. Divided and this application filed August 16, 1929. Serial No. 386,428.

The invention relates to a method for reclaiming automobile radiators, and particularly for separating the plates and tubes of the type of radiator that is formed of a plurality of tubes disposed in longitudinal and transverse rows between upper and lower headers, and a series of parallel, heat-radiating plates mounted on the tubes. In radiators of this type, the tubes are usually formed of copper and the plates and headers of yellow brass; the ends of the tubes are soldered to the headers and the plates are held in position on the tubes by a small amount of solder. In recovering metal from discarded radiators of the type referred to, it has been customary to smelt them in a suitable furnace. This method results in considerable loss, chiefly on account of the oxidation of some of the zinc contained in the brass headers and plates and the recovered metal is of much less value than would be the case if the brass headers and plates were mechanically separated from the copper tubes. If attempt is made to first heat the radiators to melt the solder and then pull the tubes and plates apart by the application of force lengthwise of the tubes, the plates twist and bind firmly on the tubes.

In accordance with the present invention, the headers are first removed from the ends of the tubes and the mechanical separation of the plates and tubes is effected by the application of pressure to the longitudinal edges of the plates, such pressure being applied to the plates, one or two at a time, and to the portions of the plates between the transverse rows of tubes. It is also noted that the pressure is preferably applied simultaneously to all of the portions of each plate between the transverse rows of tubes and in a direction substantially transversely of the tubes and to some extent longitudinally thereof. In this way, the plates, which are quite thin, are torn along the lines of the transverse rows of tubes and so stripped therefrom.

The foregoing and other features of the invention are hereinafter more fully set forth and are particularly defined in the appended claims. While other means may be employed, the improved method is preferably carried out in an apparatus illustrated in the accompanying drawings, and more particularly set forth and claimed in a co-pending application filed in the United States Patent Office by me February 10, 1927, Serial No. 167,337, and patented August 27, 1929, No. 1,725,990, and of which the present application is a division.

In the accompanying drawings:

Figs. 1 and 2 are partial plan and longitudinal sections respectively of the apparatus.

Fig. 3 is a detail section on the line 3—3 of Fig. 1.

Fig. 4 is an enlarged detail view illustrating the method of stripping the plates from the radiator tubes.

Fig. 5 is a detail section on the line 5—5 of Fig. 4.

Fig. 6 is a detail vertical section illustrating another form of apparatus.

Fig. 7 is an elevation of the type of radiator to which the present reclaiming method is applied.

As shown in Figs. 4, 5 and 7, the type of radiator treated comprises headers $a$ and $b$, longitudinal and transverse rows of copper tubes $c$, the ends of which extend into and are soldered to the headers, and a large number of radiating plates $d$ through which the tubes extend and which are secured in parallel, spaced relation on the tubes by a small amount of solder. Usually, also, the radiator is provided with a steel supporting bar $e$ perforated to receive the tubes and to which the latter are fixed adjacent their lower ends. This bar serves as a means for securing the radiator in position on the automobile chassis.

In recovering metal from such discarded radiators in accordance with the present invention, the headers $a$ and $b$ which, as stated, are usually formed of yellow brass, are first removed. This may be effected by heating the radiator to melt the solder and then pulling the headers from the tubes. Preferably, however, the separation is effected mechanically to avoid the necessity of heating the radiator, by sawing or shearing through the tubes in planes closely adjacent the walls of the radiators into which the ends of the tubes extend, as indicated by the lines *f—f* and *g—g* respectively of Fig. 7. Then by the application of pressure to the plates, one or two at a time, and to the portions of the edges of the plates in alignment with the spaces between the transverse rows of tubes, the plates are torn along the lines of the transverse rows and so stripped from the tubes.

This method of mechanically separating the plates and tubes is preferably carried out by the apparatus shown in Figs. 1 to 5 inclusive. Such apparatus comprises opposite side frames 10 connected by one or more suitable transverse members 11 and having a horizontal supporting bed plate 12 at one end and adjacent its upper portion. This bed plate is mounted upon flanges 13 and 14 formed upon the side frames 10 and upon the upper end of the adjacent transverse member 11. A horizontal U-shaped guide frame 15 is mounted on the bed plate between a pair of longitudinal guide bars 16 and is movable lengthwise over the bed and beneath a transverse angle bar 17 which is secured at its ends to the upper edges of the side frames 10. Preferably, as shown, the guide frame 15 is provided with racks 18 which mesh with gears 19 on a transverse feed shaft 20. The latter is connected by a pair of bevel gears 21 to a longitudinally extending shaft 22 having a crank disk or wheel 23 on its outer end.

The radiator, after the headers have been removed and the ends of the supporting bar *e* cut off, is placed within the guide frame 15 with the tubes extending longitudinally thereof and the plates disposed in vertical planes, extending between the side members of the guiding frame and resting on the bed plate 12. The frame 15 is open at its inner end and its side members, as shown in Fig. 2, are preferably provided with inturned lugs 24 to hold the radiator against displacement. Then by rotating the feed shaft 20 by means of the drive shaft 22 and hand wheel 23, the radiator is fed inwardly into the path of the strippers which are moved past the inner end of the bed plate.

The strippers are preferably in the form of wedge-shaped teeth 25 formed or mounted upon the peripheral portions of a series of rotatable disks 26. The latter are mounted in spaced relation upon a transverse shaft 28 that is journaled in suitable bearings on the side frames 10 and is provided with means (not shown) for rotating it and the stripping disks in forward direction, as indicated by the arrow in Fig. 2. The spacing and width of the strippers and disks are such that, as indicated in Figs. 4 and 5, they will pass between the transverse rows of tubes of the radiator as the latter is advanced over the bed 12. Preferably the width of the stripping teeth is substantially as indicated in Fig. 5; that is to say, somewhat less than that of the spaces between the transverse rows of tubes. The strippers on the different disks are arranged in horizontal alignment so that, as the disks are rotated in forward direction and the radiator fed forwardly over the inner edge of the bed plate, one set of stripping teeth will engage one or two of the plates and simultaneously apply pressure to the edge portions thereof in alignment with the spaces between the transverse rows of tubes. The path of movement of the pointed ends of the strippers 25 is indicated by dot and dash line in Fig. 4, and it is noted that pressure is applied to the portions of the plates between the transverse rows of tubes in a direction edgewise of the plates or transversely of the tubes and to some extent longitudinally of the tubes. The effect of this application of pressure is to tear the plates along the lines of the transverse rows of tubes, as indicated by the dotted lines *h* in Fig. 5, and the brass plates are thus torn and stripped quite cleanly from the copper tubes.

Preferably, for effective operation, the edges of the forward faces of the wedge-shaped strippers or teeth 25 are concave as shown, and the rear faces convex, and the spacing of the sets of strippers or teeth on the disks is at least equal to the width of the radiator plates, so that only one transverse set of strippers will be in operation at one time. While the points of the wedge-shaped strippers are preferably quite sharp to enter between the spaced plates, their other edges are not sharp. That is to say, the working faces are quite wide and blunt, so that the strippers tear the plates and do not cut them.

As the plates are progressively acted upon and torn and stripped from the tubes, the latter are held in position by the remaining plates which rest upon the bed 12 and these plates are held in position by the transverse bar 17 that extends over and engages the upper edges of some of the plates, as most clearly indicated in Fig. 4. In separating the plates and tubes of a radiator having no transverse bar *e*, the plates are preferably stripped from substantially one-half of the radiator and the latter is then reversed in position, and the remaining or nearly all of the remaining plates are stripped therefrom. If the radiator section has one of the supporting bars, the brass plates on one side of this bar can be stripped from the tubes and then the radiator section can be reversed in position and the plates on the other side stripped.

Fig. 6 shows an apparatus in which a single set of strippers 25' are mounted upon a vertically reciprocating bar 28 guided in uprights 29 on the main frame and connected by links 30 to a crankshaft 31, so that by driving the crankshaft the strippers are vertically reciprocated. Preferably, however, the strippers are mounted on rotary disks, as shown in Figs. 1 to 5 inclusive, but, when so arranged, it is desirable that the guiding bed 12 should be so located and the stripping disks of such size that the movement of the teeth in applying pressure to the plates to strip them from the tubes is, as indicated in the dot and dash line in Fig. 4, in a direction transversely of the tubes and only to a slight extent longitudinally thereof. It is noted, however, that the wedge-shaped working faces of the strippers which are inclined to the paths of movement thereof, not only apply the edgewise pressure to the plates, but also tend to move the portions of the plates engaged thereby longitudinally of the tubes, and this operation and the effect of applying the pressure in this way facilitates the tearing of the plates and the stripping of the torn plates from the tubes. To prevent the pressure of the strippers on the plates from bending the tubes, the supporting bed should extend closely adjacent the path of movement of the strippers.

As stated, the improved apparatus herein set forth is described and claimed in the above mentioned co-pending application, Serial No. 167,337. Other means may be employed in carrying out the present method and the details set forth may be varied without departure from the scope of the invention as defined in the appended claims.

I claim as my invention:

1. The method of separating the plates from the tubes of automobile radiators which consists in progressively applying edgewise pressure to the plates to tear the same and strip them from the tubes passing therethrough while holding the tubes in position by the remaining plates.

2. The method of separating the plates of automobile radiators from the transverse and longitudinal rows of tubes passing through the plates, which consists in applying pressure to the plates to tear them along the lines of the transverse rows of tubes and strip them from the tubes.

3. The method of separating the plates of automobile radiators from the longitudinal and transverse rows of tubes passing through the plates, which consists in progressively applying pressure to the plates, both transversely and longitudinally of the tubes to tear the plates along the lines of the transverse rows of tubes and strip the plates from the tubes.

4. The method of separating the plates of automobile radiators from the rows of tubes passing therethrough, which comprises applying edgewise pressure to the portions of the plates between the rows of tubes to tear the plates and strip them from the tubes.

5. The method of reclaiming automobile radiators formed of headers, connecting tubes and heat-radiating plates on the tubes, which comprises removing the headers and then mechanically separating the plates and tubes by the application of pressure to the portions of the longitudinal edges of the plates in alignment with the spaces between the rows of tubes, to tear the plates along the lines of such rows and strip them from the tubes.

6. The method of mechanically separating the plates and tubes of discarded automobile radiators, which comprises applying pressure to the plates, one or two at a time, and simultaneously to spaced portions of each plate in alignment with the spaces between the transverse rows of tubes and in a direction both transversely and longitudinally of the tubes, to tear the plates along the lines of the transverse rows of tubes and strip the plates therefrom.

ARCHIBALD O. MASON.